US011280721B2

(12) United States Patent
Sin Xicola et al.

(10) Patent No.: US 11,280,721 B2
(45) Date of Patent: Mar. 22, 2022

(54) METHOD AND EQUIPMENT FOR DETERMINING CONDITIONS OF STICTION BETWEEN A BRAKING ELEMENT AND AN ELEMENT TO BE BRAKED

(71) Applicant: ITT ITALIA S.R.L., Lainate (IT)

(72) Inventors: Agustin Sin Xicola, Barge (IT); Lorenzo Fedrizzi, Barge (IT); Francesco Andreatta, Barge (IT); Alessandro De Nicolo, Barge (IT)

(73) Assignee: ITT Italia S.R.L., Lainate (IT)

( * ) Notice: Subject to any disclaimer, the term of this patent is extended or adjusted under 35 U.S.C. 154(b) by 15 days.

(21) Appl. No.: 16/330,364

(22) PCT Filed: Sep. 5, 2017

(86) PCT No.: PCT/IB2017/055334
§ 371 (c)(1),
(2) Date: Mar. 4, 2019

(87) PCT Pub. No.: WO2018/042404
PCT Pub. Date: Mar. 8, 2018

(65) Prior Publication Data
US 2021/0278336 A1   Sep. 9, 2021

(30) Foreign Application Priority Data

Sep. 5, 2016   (IT) .................. 102016000089576

(51) Int. Cl.
*G01N 17/02*   (2006.01)
*G01N 27/416*   (2006.01)
(Continued)

(52) U.S. Cl.
CPC ......... *G01N 17/02* (2013.01); *G01N 27/4161* (2013.01); *G01N 27/48* (2013.01); *B60T 8/172* (2013.01); *G01N 19/04* (2013.01)

(58) Field of Classification Search
CPC ........ B60T 8/172; G01N 17/02; G01N 19/02; G01N 19/04
See application file for complete search history.

(56) References Cited

U.S. PATENT DOCUMENTS 5,795,990 A    8/1998   Gitis et al.

FOREIGN PATENT DOCUMENTS

ES        2490115 A1   9/2014
WO    WO 2018/042404 A1   3/2018

OTHER PUBLICATIONS

Stojadinović et al., "Effect of electrode potential on the tribocorrosion of tungsten," Tribology International 42 (2009) 575-583 (Year: 2009).*

(Continued)

*Primary Examiner* — Alexander S Noguerola
(74) *Attorney, Agent, or Firm* — Knobbe, Martens, Olson & Bear, LLP

(57) ABSTRACT

Methods and equipment for determining conditions of adhesion between a first and a second mechanical element are disclosed. The mechanical elements are attached respectively to a first and second support, which are immersed in an electrolyte together with a counter-electrode and a reference electrode to form an electrochemical cell. The second mechanical element is a working electrode being connected to an insulated electric wire that is also connected to the counter-electrode. A first uncovered face of the second element is pressed against the first element. A potential is applied to the second element of at least one predetermined value and/or a predetermined electrical current. The method can include detecting the electrical current that is transmitted through the electrolyte as a function of the potential applied and/or the potential that is established as a function of the predetermined current.

17 Claims, 3 Drawing Sheets

(51) Int. Cl.
  *G01N 27/48* (2006.01)
  *B60T 8/172* (2006.01)
  *G01N 19/04* (2006.01)

(56) References Cited

OTHER PUBLICATIONS

Radice et al., "Effect of electrochemical and mechanical parameters on the lubrication behavior of Al2O3 nanoparticles in aqueous suspensions," Wear 261 (2006) 1032-1041 (Year: 2006).*
Joo et al., "Tribo-electrochemical characterization of copper thin films," Electrochimica Acta 99 (2013) 133-137 (Year: 2013).*
International Search Report and Written Opinion in corresponding International Patent Application No. PCT/IB2017/055334, dated Dec. 15, 2017, in 13 pages.
International Preliminary Report on Patentability (IPRP) for Application No. PCT/IB2017/055334, dated Mar. 5, 2019, in 7 pages.
First Chinese Office Action in Application No. 201780059767.3, dated Feb. 3, 2021 in 6 pages.

* cited by examiner

METHOD AND EQUIPMENT FOR DETERMINING CONDITIONS OF STICTION BETWEEN A BRAKING ELEMENT AND AN ELEMENT TO BE BRAKED

TECHNICAL FIELD

The present disclosure relates to a method and equipment for studying and establishing the physic-chemical conditions of stiction between a braking element, in particular a brake pad, and an element to be braked, in particular a vehicle brake disc.

PRIOR ART

It is known that, particularly under harsh operating and/or environmental conditions, for example, frequent off-road driving and/or driving on muddy tracks or routes exposed to brackish air or acid rain, this may result, in use, in the "gluing" of one or more of the brake pads of a vehicle to the relative brake disc made of cast iron or steel. This is generally due to corrosive phenomena chat affect the brake disc and that, during braking, result in the corrosion products combining with the friction material of the brake pad causing accidental adhesion of the brake pad to the brake disc, adhesion that is temporarily maintained even when the vehicle brake is deactivated. This phenomenon of adhesion is known by the English technical term "stiction", a term that derives from the contraction and merging of the terms "static" and "friction", i.e. the term "static friction".

The occurrence of a stiction gluing phenomenon on a vehicle in use involves various drawbacks, such as jolts/straining during braking and, subsequently the releasing of the brake, increased energy consumption and, in extreme cases, breakage of the friction material of the brake pad, which leads to vehicle breakdown and/or the necessity for the premature replacement of the brake pads.

Currently, there is no standardized and precise method or system for envisaging or at least reliably detecting the occurrence of "stiction" phenomena, nor that provides easily interpretable results in order to experimentally establish the chemical-physical conditions that can cause the onset thereof.

SUMMARY OF THE DISCLOSURE

The purpose of this disclosure is to provide a simple and reliable method and simple and reliable equipment for studying and establishing the physic-chemical conditions of stiction between two mechanical elements and, specifically, between a braking element, in particular a brake pad, and an element to be braked, in particular a vehicle brake disc, in other words, to study and determine in the laboratory the causes of the stiction gluing phenomenon in vehicles.

This disclosure therefore provides a method and equipment for studying and establishing the physic-chemical conditions of stiction between two mechanical elements, and specifically between a braking element, in particular a brake pad, and an element to be braked, in particular a vehicle brake disc, having the characteristics set forth in the attached claims.

BRIEF DESCRIPTION OF THE DRAWINGS

This disclosure will now be described in more detail with reference to the figures of the annexed drawings, in which.

DETAILED DESCRIPTION

Figure 1:
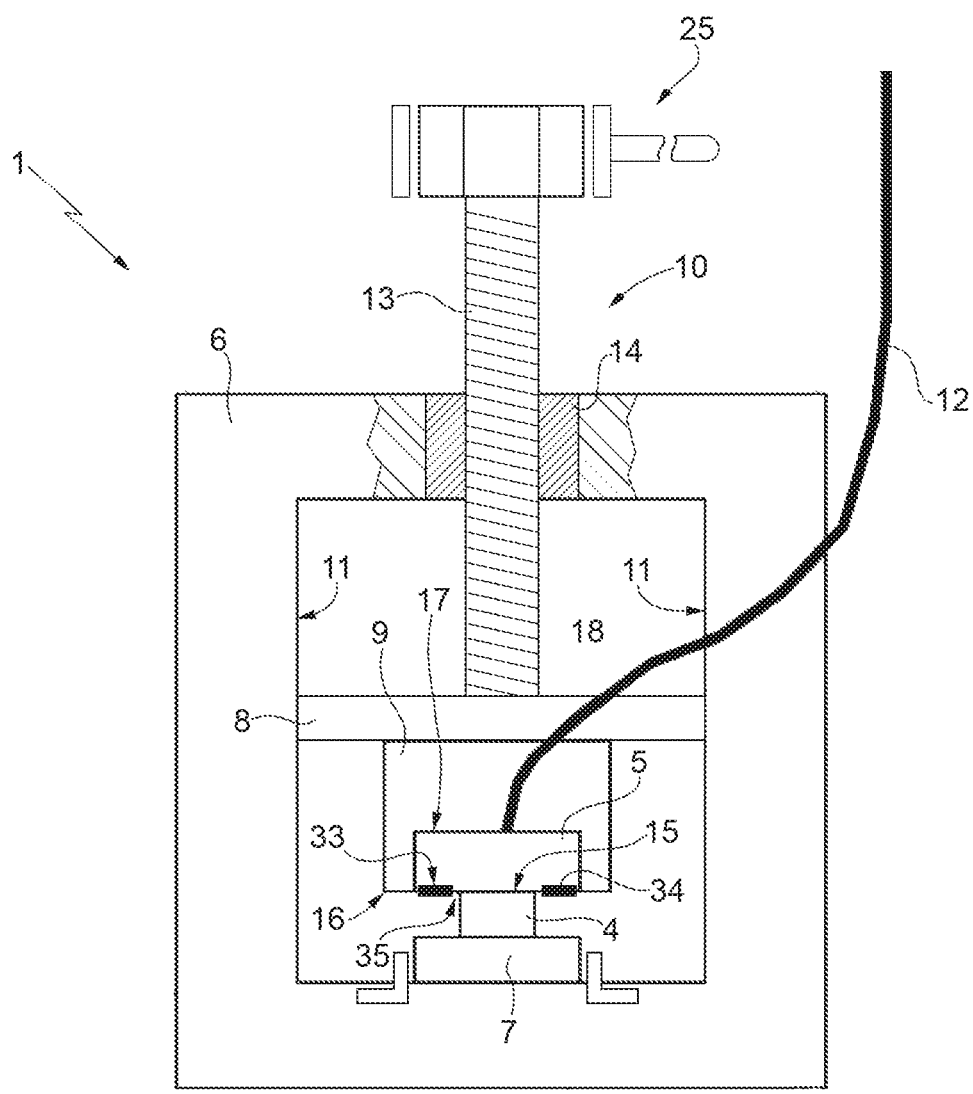
FIG. 1 schematically illustrates an elevation view, partly in section, of an element called a stiction ceil forming part of an electrochemical cell pertaining to a measuring equipment made according to the disclosure.
Figure 2:
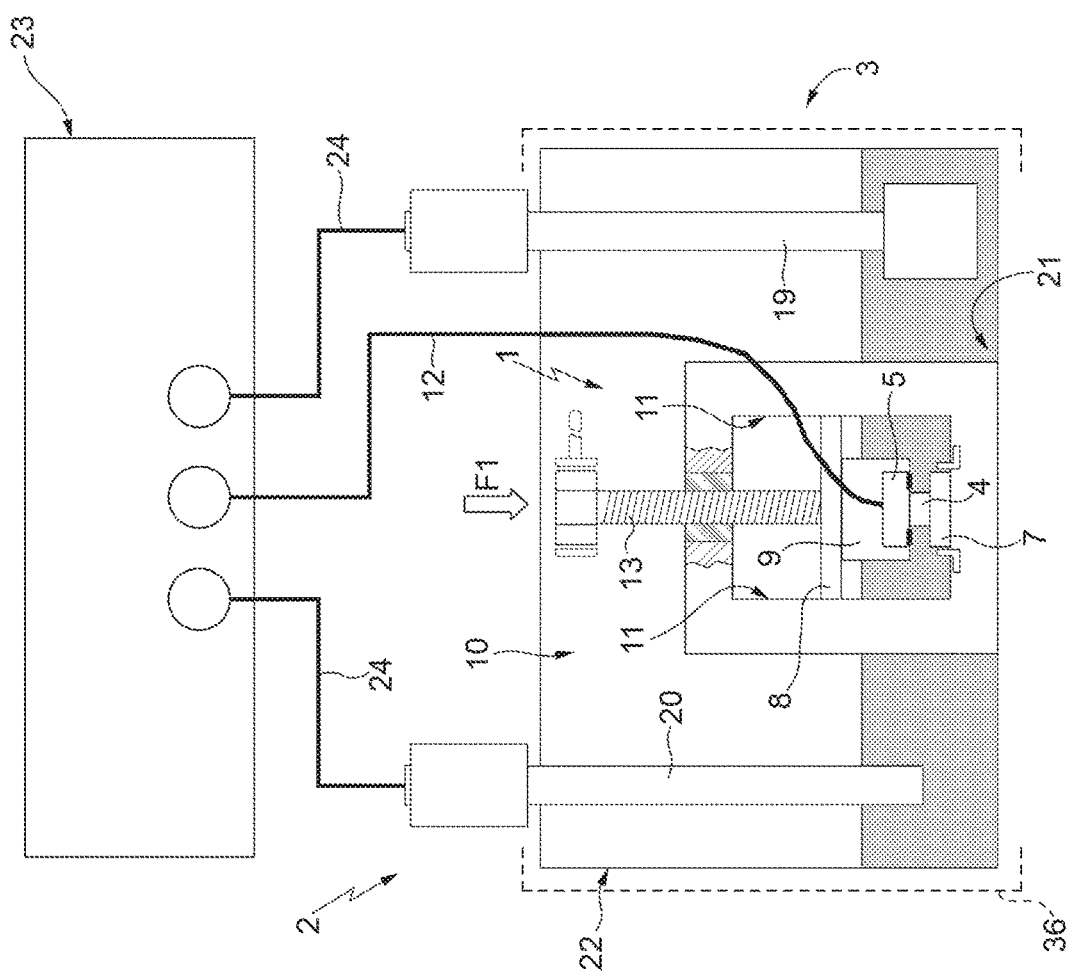
FIG. 2 schematically illustrates a three electrode electrochemical cell implemented using the stiction ceil in FIG. 1 and how the electrochemical cell is connected to a potentiostat/galvanostat for the performing of measurements to trigger the phenomenon of stiction by means of the use of electrochemical techniques.

With reference to FIGS. 1 and 2, it is indicated as a whole by reference number 1 a stiction cell forming part of an equipment 3. The stiction cell 1 is used to create an electrochemical cell 2 with the three-electrode configuration illustrated in FIG. 2. In addition, FIG. 2 shows how the electrochemical cell 2 is connected to a potentiostat/galvanostat. The electrochemical cell 2 together with the potentiostat/galvanostat is part of the equipment 3. This equipment 3 is used for studying and establishing the physic-chemical conditions of stiction between two mechanical elements 4 and 5, particularly between a braking element, such as a brake pad, and an element to be braked, such as a steel or cast-iron brake disc, known and not illustrated for simplicity.

The stiction cell 1 comprises (FIG. 1): a body 6 made in a synthetic plastic material or other electrically non-conductive material, in the illustrated example shaped in the form of a rectangular frame, and having a first support 7 designed to receive the first mechanical element 4 merely resting thereupon and, however, with the possibility of rotation of the mechanical element around itself; a slide 8 carried sliding by the body 6 on the opposite side to the support 7 and which carries a second support 9 suitable to rigidly receive in an angularly fixed way the second mechanical element 5; and a device 10 for moving the slide 8 with respect to the support 7.

The support 9 is, as will be seen, a block of polymeric resin wherein there is embedded/incorporated, in the preferred embodiment illustrated, a disk sample 5, and which further contains an insulated electrical contact 12 for the connection of the sample 5 to the potentiostat as a working electrode.

The slide 8 slides along the respective lateral guides 11 of the body 6 that prevent the slide from rotating and is movable along the guides 11 to and from the first support 7.

The second support 9 consists of a prismatic block of an epoxy resin designed to carry internally embedded, in use, the second mechanical element 5, as is well illustrated in FIG. 1, leaving uncovered only one face 15 thereof arranged flush with one front end 16 of the second support 9 facing the first support 7.

This prismatic block is provided with the contact 12 consisting of an electrically insulated wire connected to the second mechanical element 5; the support 7 is carried by the body 6 in a static, fixed and predetermined position, arranged in axis with the support 9.

The handling device 10 preferably includes a metal screw 13 arranged in axis with the supports 7 and 9 and mechanically connected to the slide 8 and a metallic nut 14 engaged by the screw 13 and mounted through the body 6, integral to the same.

The slide 8 consists of a metallic bar, preferably prismatic.

The electric wire 12 is mechanically and electrically attached to a second face 17 of the mechanical element 5 opposite the face 15 by means of a welding spot 18 (FIG. 1) or by means of any other type of joint that allows for electric current passage and only subsequently is the support 9 made by means of cold molding (the epoxy resin, as is known, polymerizes at room temperature for which reason it is sufficient to pour the resin into an open mold wherein the element 5 has been arranged, already attached to the insulated electric wire 12) incorporating, in a fluid tight manner, both an end part of the electric wire 12, soldered to the mechanical element 5, and substantially all of the mechanical element 5 with the exception of the face 15 thereof, which remains uncovered by the support 9 and therefore exposed to the surrounding environment. The rest of the electric wire 12 protrudes for all the length thereof and in a fluid tight manner beyond the support 9.

The equipment 3 comprises the electrochemical cell 2 in the entirety thereof (FIG. 2), which comprises the stiction cell 1 already described, a counter-electrode 19 of the type normally used as a cathode in electrochemical cells, for example a platinum wire, a reference electrode 20 for the measurement of the potential, for example of the type Ag/AgCl (silver/silver chloride), and a container 22 for an electrolyte 21, within which the electrodes 19 and 20 and the supports 7 and 9 integrally provided with the mechanical elements 4 and 5 are immersed, but not the slide 8.

The electrochemical cell 2 is therefore electrically composed by the working electrode consisting in the example illustrated by the sample of the element to be braked 5 (disc) assembled such that it is in contact with all or part of a braking element 4 (pad) by means of the stiction cell 1; by the reference electrode 20 consisting of any reference electrode that can be used for electrochemical measurements (for example an Ag/AgCl electrode (3M KCl); and by the counter-electrode 19 consisting of any counter-electrode that, can be used for electrochemical measurements (for example a Pt electrode).

The electrolyte consists of any electrically conductive aqueous solution, for example from an aqueous solution of sodium chloride, for example at a concentration of 1% by weight of NaCl.

The equipment 3 also comprises a potential/current generator 23 consisting of an electronic potentiostat/galvanostat to which the reference electrode 20 and the counter-electrode 19 are electrically connected by means of appropriate cables 24 and to which the insulated electric wire 12 is also electrically connected, such that the second mechanical element 5, when it is electrically connected to the insulated electric wire 12, constitutes a working electrode of the electrochemical cell 2. Obviously, depending upon the experiments to be performed, a voltage generator only can be used, such as a potentiostat, or an electrical current generator only, such as a galvanostat, can be used instead of an instrument that can be used to generate both potential differences, fixed or variable, and preset or variable value electrical currents, and to polarize the working electrode in order to obtain potentiostatic or potentiodynamic polarization curves, everything according to settings that can be adjusted on the instrument 23. The equipment 3 finally comprises a torque wrench 25 of any known type for rotating the screw 13 in such a way as to push the second support 9 towards the first support 7 by applying a predetermined and known amount of torque to the screw 13.

By turning the screw 13 the exposed face 15 of the mechanical elements 5 is brought into contact with the mechanical element 4 and then pushed against it with a known and predetermined force, which is adjustable by means of the torque wrench 25.

Figure 4:
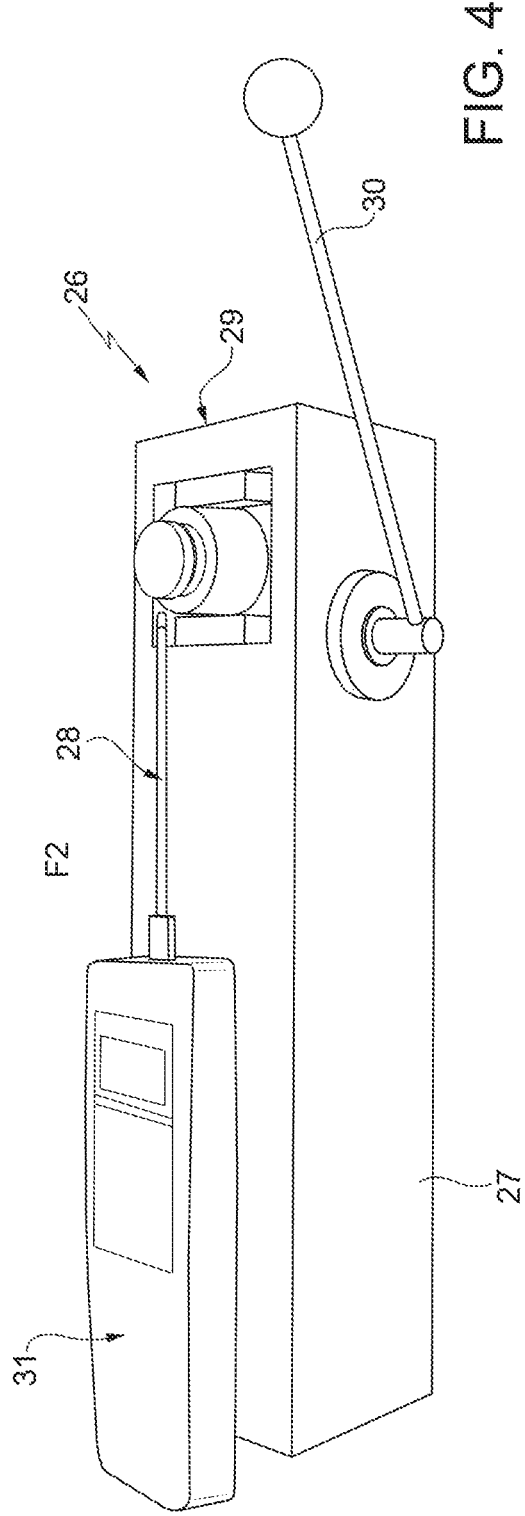
FIG. 4 illustrates a three-quarters prospective schematic view of a further component of a measuring equipment component.

The equipment 3 is, according to an aspect of the disclosure, completed by a test bench 26 illustrated schematically in FIG. 4.

The test bench 26 includes a support base 27 designed to receive in use the mechanical elements 4 and 5, which are glued together by stiction, as will be seen, by the effect of the electrochemical process that occurred previously within the electrochemical cell 2; the support base 27 is equipped with a pusher 28 and a vice 29 designed to apply in use a progressively increasing thrust to one of the mechanical elements 4, 5 while the other is held firm by the vice 29. For example, the vice 29, which is movable on the base 27 and which holds the element 5 glued to the element 4 due to stiction but with the element 4 not tightened by the vice 29, is pushed by a lever 30 towards the pusher 28, fixed on the support base 27; an instrument 31, connected to the pusher 28 and integrally carried by the base 27 completes the test bench 26, in order to measure the thrust, i.e., the force, exchanged between pusher 28 and the element 4 due to the movement of the vice 29.

In particular, as will be seen, as a result of exposure to the electrolyte 21 and the electrochemical procedure carried out by the electrochemical cell 2, whilst the screw 13 pushes the face 15 against the element 4 with the predetermined force, the two mechanical elements 4 and 5 are made to permanently adhere to each other due to a stiction gluing phenomenon and are carried to the test bench 26 joined together; furthermore, the element 5 is rigidly incorporated into the support 9, which is then also transferred to the test bench 26 and which is used for example in order to block the element 5 on the support base 27 by means of the vice 29, while the pusher 27 acts laterally against the mechanical element 4.

Using the equipment 3 described thus far, a method can be followed for studying and establishing the physic-chemical conditions of stiction between two mechanical elements 4, 5, in particular between a braking element and a vehicle element to be braked.

Figure 5:
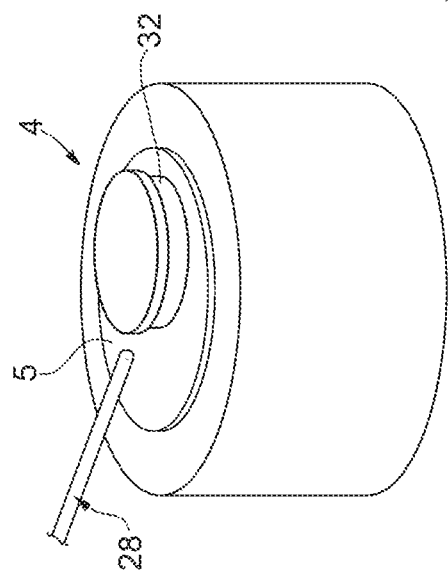
FIG. 5 illustrates in detail how a sample of an element to be braked (brake disc) mounted in contact with a braking element (brake pad) is positioned within the equipment component of FIG. 4.

In fact, according to the method of the disclosure, the first mechanical element 4 is a sample of predetermined first dimensions taken from a vehicle braking element in such a way as to include a friction material 32 (FIG. 5), in particular it consists of a portion of a brake pad, which is placed in a removable manner onto the support 7 with the friction material 32 facing upward, i.e. on the side opposite to the support 7 and towards the support 9 and the screw 13.

The second mechanical element 5, on the other hand, is a sample of predetermined second dimensions taken from a vehicle braking element, in particular it consists of a portion of a brake disc made of steel or cast iron of transverse dimensions (i.e. measured perpendicularly to the screw 13) that are greater (for example double or triple) than those of the element 4.

This brake disc portion, forming the mechanical element 5, is cut from a production brake disc specimen; then to this portion of brake disc 5 the electric wire 12 is soldered onto the face 17 opposite the face 15 and finally the brake disc 5 portion, with the end of the wire 12 soldered to it, is incorporated into the support 9, which is integrally formed by embedding the element 5 and an end portion of the electric wire 12 facing towards the brake disc 5 portion, leaving the face 15 uncovered, i.e. not covered by the support 9. When the stiction cell 1 bearing the portions of brake pad 4 and brake disc 5 is immersed in the electrolyte 21, the face 15 that comes into contact with the electrolyte 21 is therefore larger than that of the brake pad portion 4 and, therefore, of the transverse dimensions of the portion of friction material 32 that has been cut integrally with the portion of brake pad 4.

According to one aspect of the disclosure, the face 15 therefore has a portion 33 exceeding the transverse dimensions of the first mechanical element 4: this portion 33, generally of an annular form and peripherally external is masked, with the exception of a small annular region 35 immediately adjacent to the mechanical element 4, in this case, immediately adjacent to the friction material 32. For example, the masking is carried out with an electrically non-conductive lacquer 34 or with a water-resistant adhesive tape and having a central hole with a predetermined diameter, in such a way as to always have the same exposed disc surface area.

The small region 35 is therefore left uncovered by the lacquer 34 or the adhesive tape. It should be noted that here and hereinafter the term "small" means a measurement of the order of a few millimeters.

On the basis of that which has hitherto been described, the method therefore includes the steps of:
  electrically connecting the second mechanical element 5 to an insulated electric wire 12;
  mounting the first mechanical element 4 and the second mechanical element 5 onto a stiction ceil 1 comprising a first support 7 and a second support 9 positioned opposite one another and being relatively axially movable, the second support towards the first support, placing the first mechanical element 4 on the first support 7 and attaching the second mechanical element 5 to the second support 9, in such a way that the insulated electric wire 12 extends in a fluid tight manner from the second support 9 and the second mechanical element 5 is fully embedded within the second support 9 except for a first face 15 thereof that is not covered by the second support 9 and that is arranged flush with a front end 16 of the second support 9 facing towards the first support 7 and the first mechanical element 4 coupled therewith;
  making to adhere and then pressing by means of a first predetermined force (F1) (FIG. 2) the first face 15 of the second mechanical element 5 against the first mechanical element 4 pushing the second support 9 towards the first support 7;
  immersing said first and second mechanical elements 4, 5 together with said first and second supports 7, 9 in an electrolyte 21 together with at least one counter-electrode 19 and a reference electrode 20 in such a way as to form an electrochemical cell 2 of which the second mechanical element 5 constitutes a working electrode;
  electrically connecting the insulated electric wire 12, the counter-electrode 19 and the reference electrode 20 to a potential and/or current generator 23, in the example illustrated to the potentiostat/galvanostat 23;
  carrying out by the potential and/or current generator 23, which is connected to the electrochemical cell 2, electrochemical tests, wherein progressively variable potentials are applied between the working electrode 5 and the reference electrode 20 and/or a progressively variable electric current passage is established between the counter-electrode 19 and the working electrode 5, by the action of which a corrosive phenomenon is made to happen between the first face 15 of the second mechanical element 5 and the first mechanical element 4;
  detecting by means of the potential/current generator 23 or with another instrument the electric current that is passed through the electrolyte 21 between the second mechanical element 5 and the counter-electrode 19 as a function of the potential applied or, conversely, detecting the potential that is established between the second mechanical element 5 and the reference electrode 20 as a function of the predetermined current which is set on the potential/current generator 23.

The electrochemical tests that are performed are chosen from the group consisting of:
  1) OCP ("open circuit potential") measures along time;
  2) potentiostatic or potentiodynamic polarization curves;
  3) chrono-potentiometric measures;
  4) chrono-amperometric measures;
  5) any combination of the above;

The execution of the electrochemical tests is finalized to cause corrosive phenomenons on the second mechanical element 5 which establish the chemical-physical conditions for the stiction phenomenon.

Figure 3:
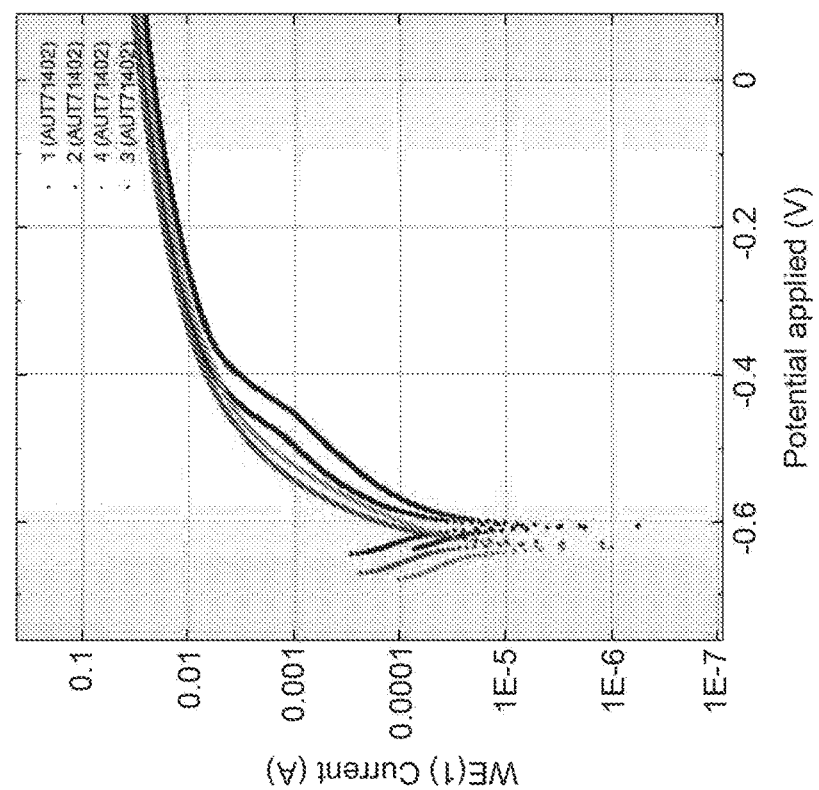
FIG. 3 illustrates an example of electrochemical measurements that can be obtained by means of using the measurement equipment components illustrated in FIG. 2.

In this way, different types of electrochemical measurements are obtained, such as the current-voltage diagrams of the type shown in FIG. 3.

According to a first preferred embodiment, the method comprises the steps of:
  measuring, by means of the reference electrode 20, the open circuit potential (i.e. when no voltage is applied between the working electrode, consisting of the second mechanical element 5, and the counter-electrode 19) of the working electrode consisting of the second mechanical element 5; and the step of
  taking the second mechanical element 5 to a progressively increasing or descending potential with respect to the reference electrode 20, starting from a first value and up to a second value, which values are a function of predetermined potential differences with the open circuit potential of the working electrode 5 measured previously or with the reference electrode 20; and the step of:
  detecting by means of the potential/current generator 23 or with another instrument the value of an electric current passing between the second mechanical element 5 and the counter-electrode 19 as a function of the applied potential.

In a second preferred embodiment, the method comprises the step of applying in succession a first predetermined and constant potential to the mechanical element 5 constituting the working electrode for a first period of time and then a second predetermined and constant potential for a second period of time; and the step of detecting by means of the potential/current generator 23 or with another instrument the value of the electric current passing between the second mechanical element 5 and the counter-electrode 19 during the application of the first, and thereafter the second, predetermined and constant potential (chrono-ammeter measurement). In a third preferred embodiment of the method, a chrono-potentiometric measurement is performed wherein a fixed current is passed between the working electrode (element 5) and the counter-electrode 19 and the potential of the element 5 is measured with respect to the working electrode for a predetermined length of time (for example 1 h).

Subsequently, a potentiodynamic measurement is taken starting from a first predetermined potential and up to a second predetermined potential using a scanning speed (i.e. a speed of variation of the potential) which is fixed (potentiodynamic polarization curve).

The current set on the potential/current generator 23 according to a further possible embodiment and/or the electrical potential applied to the second mechanical element 5 according to the preferred embodiments described above are chosen in order to induce the corrosion of the first face 15 of the second mechanical elements 5, due to anodic dissolution; in particular, insofar as the face 15 is partially masked by the lacquer 34 or the adhesive tape, corrosion is induced only in the region 35 and on the portion of the surface 15 that is in direct contact with the anti-friction material 32 of the mechanical element 4 constituted by the portion of brake pad.

At the end of the electrochemical measurements performed in the electrolyte 21, the electrochemical cell 2 made using the stiction cell 1 is disconnected from the potentiostat. The stiction cell 1 is then extracted from the test electrolyte and placed in the oven where it is subjected to a drying/desiccation treatment. Subsequently, the stiction cell 1 must again be left to cool at room temperature for a predetermined period of time, such as a few hours.

Following the drying/desiccation procedure within the oven and the subsequent: cooling at room temperature, the first face 15 of the second mechanical elements 5 adheres to the first mechanical element 4 due to a stiction gluing phenomenon; in particular, the portion of the surface 15 in contact with the anti-friction material 32, undergoes stiction gluing.

The method described thus far also includes the steps of picking up the mechanical elements 4 and 5 (the latter together with the support 9 within which it is incorporated) thus glued together due to stiction, from the electrochemical cell 2 and mounting them on a test bench 26 with the mechanical element 5 and the support 9 arranged downwards, i.e., towards the support base 27 and the step of detaching the second mechanical element 5 from the first mechanical element 4 by means of a pusher 28 acting laterally on the first mechanical element 4 and in a direction parallel to the first face 15, measuring a second force (F2) (FIG. 4), which is applied by/on the pusher 28 during the detachment; this second force F2 is an index of the extent of the stiction gluing phenomenon induced within the electrolytic cell 1 between the first and the second mechanical elements 4 and 5 under test; the higher the force F2, the worse (stronger) the stiction gluing phenomenon induced in the electrolytic cell 2.

An important aspect is also the way in which the first predetermined force F1 is generated and applied, by means of the rotation of the screw 13 within the nut 14 carried by the body 6 within a non-conductive material that also carries the supports 7 and 9, applying to screw 13, a predetermined torque using the torque wrench 25.

Finally, to avoid external electrical interference that could alter the measurements, the electrochemical cell 2 is housed within a Faraday cage.

To ensure proper operation, the brake disc and brake pad samples that make up the mechanical elements 5 and 4 respectively are sanded, for example, using silicon carbide abrasive paper and then preconditioned, by immersing them in the electrolyte 21 for a few minutes, for example ten, before assembling them on the stiction cell 1 or in the electrochemical cell 2; further, after the assembly of the electrolytic cell 2, a certain period of time is allowed to pass, such as 20-30 minutes, before performing the electrochemical tests, in the manner described above.

The usefulness of the described method and equipment is obvious.

In the first place, it is possible to study under precise and reproducible conditions the phenomenon of stiction gluing, and also to evaluate the gravity thereof according to the value of the force F2 measured.

Secondly, in this way it is possible, testing under the same conditions, different materials both for the brake disc and, especially for the friction material 32 of the brake pad 4, to verify which materials are more suitable for resisting/avoiding the phenomenon of stiction in use. In practice, the method described serves as an accelerated laboratory stiction test in order to test the couples (brake disc and friction material) of the most suitable materials to be used in production.

For example, applying one of the test procedures described above (chrono-potentiometric plus potentiodynamic polarization) to two different friction materials A and B, a detachment force F2 of 150 N was recorded for material A with chemical-physical characteristics that favor the phenomenon of stiction and only 10 N for a material B with chemical-physical characteristics that make it resistant to the phenomenon of stiction. In addition, the F2 detachment forces detected for such samples are in line with the indications received from field tests for the friction materials A and B.

Similarly, the specific physical-chemical conditions that cause the phenomenon on specific materials can be understood, and thus the phenomenon itself may be prevented when some or all of these conditions occur in use on the vehicle.

The purposes of the disclosure are therefore fully achieved.

The invention claimed is:

1. An article of equipment configured to determine conditions of stiction adhesion between two mechanical elements, the equipment comprising:
   a stiction cell comprising:
      a body made of an electrically non-conductive material and having a first support configured to receive a first of said mechanical elements; and
      a slide slidably mounted on the body on a side of the body opposite to the first support, the slide comprising a second support configured to receive a second of said mechanical elements, the second support further comprising an insulated electric wire which is electrically connectable to the second mechanical element;
   an electrochemical cell comprising said stiction cell, a counter-electrode, a reference electrode, and a container, the container being configured to hold an electrolyte and to enable said electrodes and said first and second supports provided with the said first and second mechanical elements to be immersed in the electrolyte; and
   an electronic instrument to which the reference electrode, the counter-electrode, and the insulated electric wire are electrically connected such that the second mechanical element, when it is electrically connected to said insulated electric wire, comprises a working electrode of the electrochemical cell.

2. The equipment according to claim 1, wherein the stiction cell further comprises a handling device configured to move the slide along guides of the body, wherein the handling device comprises:
   a screw which is mechanically connected to said slide, and
   a nut which is engaged by said screw and is mounted to the body.

3. The equipment according to claim 2, further comprising a torque wrench configured to rotate said screw in such a way as to push the second support towards the first support by applying a predetermined torque to the screw.

4. The equipment according to claim 1, further comprising a test bench comprising:
   a support base configured to receive, in a fixed position, the first and second mechanical elements joined to each other,
   a pusher carried by the support base and configured to apply increasing thrust to one of the said first and second mechanical elements, and
   a tool configured to measure the thrust applied by the pusher.

5. The equipment according to claim 1, wherein the slide comprises a metal bar and the second support comprises a block of an epoxy resin.

6. The equipment according to claim 1, wherein the second support is configured to embed the second mechanical element leaving only one face thereof uncovered and arranged such that the face is flush with a front end of the second support facing the first support.

7. A method of determining conditions of adhesion between a first and a second mechanical element, the method comprising:
   coupling the first mechanical element to a first support and the second mechanical element to a second support, the first and second support being positioned opposite one another and being axially movable;
   embedding the second mechanical element within the second support, except for a first face of the second mechanical element that is not embedded in the second support and that is arranged flush with a front end of the second support facing towards the first support;
   electrically connecting the second mechanical element to an insulated electric wire that protrudes from the second support;
   pressing, with a first predetermined force, the first face of the second mechanical element against the first mechanical element;
   pushing the second support towards the first support to realize a stiction cell comprising the first and the second mechanical elements and the first and second supports;
   immersing, in an electrolyte, said first and second mechanical elements, said first and second supports, a counter-electrode, and a reference electrode in such a way as to form an electrochemical cell of which the second mechanical element comprises a working electrode;
   electrically connecting the insulated electric wire, the counter-electrode and the reference electrode to an electrical generator;
   carrying out, using the electrical generator, electrochemical tests, wherein the electrochemical tests comprise: applying progressively variable potentials between the working electrode and the reference electrode, or establishing a progressively variable electric current passage between the counter-electrode and the working electrode; and
   detecting the electric current that is passed through the electrolyte between the second mechanical element and the counter-electrode.

8. The method according to claim 7, wherein the electrochemical tests are chosen from the group consisting of:
   OCP ("open circuit potential") measures along time;
   potentiostatic or potentiodynamic polarization curves;
   chrono-potentiometric measures;
   chrono-amperometric measures; and
   any combination of the above;
   wherein said electrochemical tests cause corrosive phenomena on the second mechanical element which establish chemical-physical conditions for the stiction phenomenon.

9. The method according to claim 7, further comprising:
   applying, in succession and to the second mechanical element, a first predetermined and constant potential for a first period of time and a second predetermined and constant potential for a second period of time; and
   detecting the value of the electric current passing between the second mechanical element and the counter-electrode during the application of the first and second predetermined and constant potentials.

10. The method according to claim 7, further comprising performing a chrono-potentiometric measurement that comprises:
    passing a predetermined current between the working electrode and the counter-electrode; and
    measuring the potential of the second mechanical element with respect to the reference electrode for a predetermined time.

11. The method of claim 10, further comprising performing a potentiodynamic measurement from a first predetermined potential to a second predetermined potential using a fixed speed variation of the potential.

12. The method according to claim 7, further comprising inducing corrosion of the first face of the second mechanical element by anodic dissolution.

13. The method according to claim 7, wherein:
    the first mechanical element comprises a first sample of first dimensions a friction material,
    the second mechanical element comprises a second sample of second dimensions;
    the first face of the second mechanical element having dimensions that are greater than those of the first mechanical element, a portion of the first face that exceeds the dimensions of the first mechanical element being masked with an electrically non-conductive material.

14. The method according to claim 7, further comprising:
    drying the stiction cell;
    cooling the stiction cell at ambient temperature, such that the first face of the second mechanical element adheres to the first mechanical element due to stiction gluing;
    mounting the stiction glued first and the second mechanical elements on a test bench;
    detaching the second mechanical element from the first mechanical element with a pusher; and
    measuring a second force, which is applied by the pusher during said detachment, said second force being an index of the extent of the stiction gluing.

15. The method according to claim 7, further comprising:
    applying the first predetermined force with a screw and a nut; and applying a predetermined amount of torque to the screw with a torque wrench.

16. The method according to claim 7, further comprising housing said electrochemical cell within a Faraday cage.

17. The method of claim 7, wherein detecting the electric current that is passed through the electrolyte between the second mechanical element and the counter-electrode comprises detecting said electric current as a function of the potential applied.

\* \* \* \* \*